United States Patent [19]

Kleinhans

[11] Patent Number: 5,193,388
[45] Date of Patent: Mar. 16, 1993

[54] METHOD AND APPARATUS FOR DETERMINING THE FLOW RATE OF A FLOWING FLUID MASS

[75] Inventor: Josef Kleinhans, Vaihingen/Enz, Fed. Rep. of Germany

[73] Assignee: Robert Bosch GmbH, Stuttgart, Fed. Rep. of Germany

[21] Appl. No.: 604,756

[22] Filed: Oct. 26, 1990

[30] Foreign Application Priority Data

Nov. 17, 1989 [DE] Fed. Rep. of Germany ....... 3938286

[51] Int. Cl.$^5$ ............................................. G01F 1/68
[52] U.S. Cl. .............................. 73/204.14; 73/204.16; 73/118.2
[58] Field of Search ............. 73/118.2, 204.14, 204.15, 73/204.16, 204.17

[56] References Cited

U.S. PATENT DOCUMENTS

| | | | |
|---|---|---|---|
| 3,603,147 | 9/1971 | Dorman | 73/204.14 |
| 3,928,800 | 12/1975 | Strenglein | 73/204.14 |
| 4,043,195 | 8/1977 | Hunting | 73/204.14 |
| 4,334,186 | 6/1982 | Sasayama et al. | 73/204.14 |
| 4,649,745 | 3/1987 | Konda et al. | 73/204.14 |
| 4,934,189 | 6/1990 | Tanimoto et al. | 73/204.15 |

Primary Examiner—Herbert Goldstein
Attorney, Agent, or Firm—Kenyon & Kenyon

[57] ABSTRACT

A method and apparatus controls the temperature of a precision resistor and, in turn, measures the flow rate of a flowing fluid mass. The precision resistor is a hot wire or hot film of an air mass meter of an internal combustion engine of a motor vehicle. Through timed current flow, the operating temperature of the precision resistor is maintained at a higher temperature than the temperature of the flowing fluid mass. The timing of the electric current for maintaining the operating temperature of the precision resistor is controlled based on the magnitude of the gating voltage supplied to heat the precision resistor.

12 Claims, 3 Drawing Sheets

METHOD AND APPARATUS FOR DETERMINING THE FLOW RATE OF A FLOWING FLUID MASS

FIELD OF THE INVENTION

The present invention relates to a method and apparatus for controlling the temperature of a precision resistor for measuring the mass flow rate of a fluid. In particular, the method and apparatus of the present invention relate to the temperature control of a hot wire or hot film, which is part of a meter for measuring the mass flow rate of air entering an internal combustion engine of a motor vehicle. Through timed current flow, the hot wire or film is maintained at an operating temperature higher than the temperature of the fluid mass.

BACKGROUND INFORMATION

Motor vehicles use temperature controlled precision resistors, in particular, hot wires or hot films, in air mass meters to measure the mass flow rate of air drawn into an internal combustion engine. The air stream entering the engine flows around the heated wire. The precision resistor, which is part of an electrical bridge circuit, is maintained at a constant operating temperature by timed current pluses. Because the heating current is a function of the temperature of the resistor and, in turn, the mass flow rate of air, the heating current is used as a measure of the mass flow rate of air drawn into the engine. Data corresponding to the mass flow rate of air is supplied to a control unit for setting the optimum operating points for the internal combustion engine.

In a typical method for controlling the temperature of a precision resistor for measuring the mass flow rate of air, an available voltage supply, usually the motor vehicle's power supply or battery voltage, is supplied to a voltage stabilizing circuit. The stabilized voltage is then used to control the timing of the current pulses for heating the precision resistor. Since the stabilized supply voltage is lower than the operating voltage, it takes a relatively long time after the internal combustion engine is started for the precision resistor to reach its operating temperature. Problems arise when the supply voltage drops, for example, due to a weak battery, because the voltage stabilizing circuit operates properly only when a sufficient voltage potential difference exists across its input and output terminals.

It is an object of the present invention, therefore, to overcome the problems of known methods and apparatus for controlling the temperature of a resistor for measuring mass flow rates of air.

SUMMARY OF THE INVENTION

One advantage of the method and apparatus of the present invention, is that it takes into consideration the magnitude of the gating voltage, which is used for the timing, when determining the duty cycle thereof. If, due to the state of the power supply, a relatively high gating voltage is available, the timing is carried out with a correspondingly high duty cycle. If the supply voltage drops, or if only a relatively low power supply voltage is available, the duty cycle is adapted accordingly.

The duty cycle, as it is customarily referred to in pulse technology, is the ratio of the pulse period duration to the pulse interval. The duty factor, which is the reciprocal of the duty cycle, decreases with increasing gating voltage. Thus, the cost of the method and apparatus of the present invention is typically lower than the cost of known technology, because stabilization of the gating voltage is unnecessary.

Another advantage of the method and apparatus of the present invention is that it permits the use of the maximum available gating voltage, so that a correspondingly high voltage potential is available to heat the precision resistor. This permits the precision resistor to be quickly brought to its operating temperature.

Yet another advantage of the method and apparatus of the present invention is that fluctuations in the level of the power supply voltage will typically not lead to erroneous air flow measurements. Such erroneous measurements typically occur in known systems when the gating voltage cannot be stabilized due to decreases in the supply voltage.

In one method of the present invention, the gating voltage is a supply voltage conducted through a switching element. The switching element is preferably an electronic switch. The supply voltage is preferably the battery voltage of the motor vehicle.

The present invention is directed to an apparatus for controlling the temperature of a precision resistor used for measuring the flow rate of a flowing fluid. The precision resistor is preferably a hot wire or hot film, and is maintained at an operating temperature higher than the temperature of the fluid by the flow of electric current therethrough. The electric current is timed by the electronic switch.

In accordance with a method of the present invention, a control circuit, which presets the timed operation of the electronic switch, creates a duty cycle which depends on the magnitude of the currently available gating voltage. The control circuit preferably includes a microprocessor to control the electronic switch.

An apparatus of the present invention further comprises a resistance bridge circuit, which includes two arms designed as voltage dividers. One of the two voltage dividers includes the precision resistor, which is maintained at a constant temperature. If the mass flow rate of fluid over the precision resistor changes, there is a corresponding effect on the temperature thereof. As a result, the resistance value of the precision resistor changes and, thus, the resistance bridge circuit becomes unbalanced.

In response to the resistance bridge imbalance, the control circuit changes the duty cycle of the heating pulses as a function of the magnitude of the gating voltage, so that the precision resistor is heated and, thus, maintained at the desired operating temperature. The duty cycle is, accordingly, proportional to the mass flow rate of the fluid and is also a function of the magnitude of the gating voltage.

An apparatus of the present invention preferably includes a heating resistor to heat the precision resistor. The heating resistor is operated by the switching element and is in thermal contact with the precision resistor. Alternatively, however, the bridge circuit may be designed so that the timed current flows directly through the precision resistor. In this way, the precision resistor is maintained at the desired operating temperature by its own current flow therethrough.

If a heating resistor is provided for heating the precision resistor, a voltage stabilizing circuit is preferably employed to supply the resistance bridge with a constant voltage. The voltage stabilizing circuit is in turn coupled to the microprocessor.

In order to measure the magnitude of the available gating voltage, the output of the switching element is coupled to a first port of the microprocessor. Fluctuations in the supply voltage and in the tolerances of the switching element, caused by tolerance variations between units, are therefore taken into consideration by the microprocessor. The switching element is preferably a transistor coupled to a second port of the microprocessor. The microprocessor is, accordingly, controlled to actuate the transistor.

Through the use of a control loop, the operating temperature of the precision resistor can be set and maintained. To reduce the computational load of the microprocessor, an apparatus of the present invention further includes as part of the control loop a sawtooth generator. A sawtooth voltage is supplied to a comparator for comparison with the bridge voltage, and actuation of the switching element occurs upon coincidence of the two voltages. The microprocessor forms at least a part of the sawtooth generator. However, its computational capacity is used mainly for evaluating the bridge voltage to determine the mass flow rate of air.

One advantage of the present invention, is that the control loop for setting the operating temperature is independent of the functions of the microprocessor, to the extent that the microprocessor's participation in the formation of the sawtooth voltage is disregarded. Since the sawtooth voltage has ramp-type rising edges, the coincidence time varies with varying bridge voltages. The duty cycle is set based on the varying coincidence times. The duty cycle also depends on the magnitude of the gating voltage. The gating voltage is supplied to the microprocessor, which evaluates that voltage and alters the sawtooth voltage in response thereto. The change in the sawtooth voltage may involve the amplitude, the frequency, and/or the form thereof.

Other advantages of the apparatus and method of the present invention will become apparent in view of the following detailed description and drawings taken in connection therewith.

DETAILED DESCRIPTION

Figure 1:
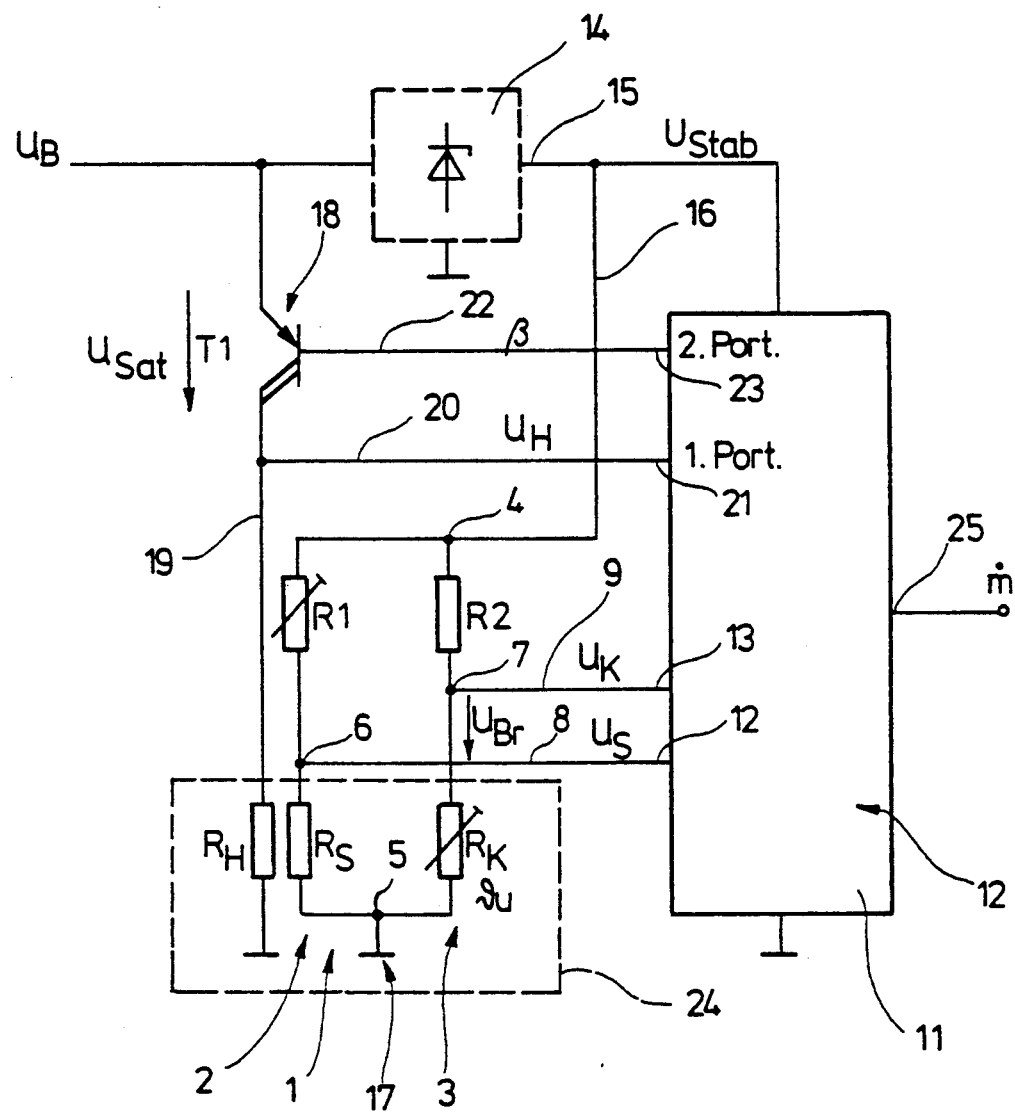
FIG. 1 is a schematic diagram of an apparatus embodying the present invention.

In FIG. 1, an apparatus embodying the present invention is illustrated. The apparatus controls the temperature of a precision resistor $R_S$ for measuring the mass flow rate of air entering an internal combustion engine (not shown). The precision resistor $R_S$ is preferably the hot film of a hot film air mass meter. The temperature of the precision resistor $R_S$ is controlled by using a heating resistor $R_H$, which is maintained in thermal contact therewith. The arrangement of such resistors is frequently used to determine the air mass flow rate ($\dot{m}$) entering an internal combustion engine of a motor vehicle (not shown).

The precision resistor $R_S$ is located in the intake port of the internal combustion engine, preferably in the area of the throttle valve. The precision resistor $R_S$, which is used for measuring the air temperature, forms a part of a bridge circuit 1, which includes two voltage dividers 2 and 3. The voltage divider 2, which includes the precision resistor $R_S$, is coupled in series with a variable resistor R1. The voltage divider 3 includes a temperature dependent resistor $R_K$, which is coupled in series with a second resistor R2.

As shown in FIG. 1, the two voltage dividers 2 and 3 are coupled together at terminals 4 and 5 to form the bridge circuit 1. The terminal 5 is coupled to ground, which is indicated by the reference numeral 17. The voltage dividers 2 and 3 include voltage taps 6 and 7, respectively. The voltage taps 6 and 7 are coupled through lines 8 and 9, respectively, to a control circuit 11, which is preferably a microprocessor.

A line 8 is coupled on one end to the voltage tap 6, which is the junction between the precision resistor $R_S$ and the variable resistor R1, for measuring the voltage $U_S$ at that tap. Another line 9 is coupled on one end to the voltage tap 7, located between the resistors $R_K$ and R2, for measuring a reference voltage $U_K$ at the tap 7. The other end of the line 8 is coupled to a terminal 12 of the microprocessor 11. The other end of the line 9 is coupled to a terminal 13 of the microprocessor 11. A bridge voltage $U_{Br}$ between the voltage taps 6 and 7 is measured and evaluated by the microprocessor 11 through the terminals 12 and 13.

The apparatus of the present invention as illustrated in FIG. 1 uses as its supply voltage the motor vehicle's power supply voltage or, i.e., the vehicle battery. Thus, the battery voltage $U_B$ of the vehicle battery serves as the supply voltage. The battery voltage $U_B$ is supplied to a voltage stabilizing circuit 14. The output voltage $U_{stab}$ of the stabilizing circuit 14 is generated through an output terminal 15. The output terminal 15 is coupled to one end of a line 16, which is coupled on its other end to the terminal 4 of the bridge circuit 1. Thus, the voltage $U_{stab}$ is supplied through the line 16 to the terminal 4 of the bridge circuit 1. The variable resistor R1 and resistor R2 are also coupled to the terminal 4, and one pole of the vehicle battery is coupled to ground. The voltage stabilizing circuit also supplies the stabilized voltage $U_{stab}$ to the microprocessor 11, as shown in FIG. 1.

The input of an electronic switching element 18 is coupled to the battery volta $U_B$. The output of the switching element 18 is, in turn, coupled through a line 19 to the heating resistor $R_H$. The other terminal of the heating resistor $R_H$ is coupled to ground. The heating resistor $R_H$ is supported in thermal contact with the precision resistor $R_S$. The level of current flowing through the heating resistor $R_H$ is a function of the mass flow rate of air entering the internal combustion engine ($\dot{m}$), as described further below.

The electronic switching element 18 is preferably a transistor T1. The emitter of the transistor T1 is coupled to the battery voltage $U_B$, and the collector is coupled to one end of the line 19, which is coupled on its other end to the heating resistor $R_H$. The collector of the transistor T1 is also coupled through a line 20 to a first port 21 of the microprocessor 11. The base of the transistor T1 is coupled by a line 22 to a second port 23 of the microprocessor 11. The line 20, which is coupled to the collector of the transistor T1, supplies a gating voltage $U_H$ to the microprocessor 11. The second port 23 of the microprocessor 11, on the other hand, supplies a duty cycle to the base of transistor T1 through the line 22, which actuates the transistor.

The precision resistor $R_S$ the heating resistor $R_H$, and the temperature dependent resistor $R_K$ are preferably located in the intake port 24 of the internal combustion engine, which is illustrated in dashed lines in FIG. 1.

Thus, the temperature of the precision resistor $R_S$ varies depending on the mass flow rate of air ($\dot{m}$) entering the intake port 24.

The microprocessor 11 is controlled, however, to maintain the precision resistor $R_S$ at a constant operating temperature by means of the heating resistor $R_H$. If, for example, the mass flow rate of air ($\dot{m}$) increases, the heating output of the heating resistor $R_H$ is correspondingly increased by the microprocessor 11. The increased heat output of the resistor $R_H$ is maintained until the desired operating temperature of the resistor $R_S$ is restored. Since the temperature dependent resistor $R_K$ is also located within the stream of intake air, the resistor $R_K$ assumes the ambient temperature of the intake air and, thus, compensates for variations in the temperature $\theta u$ thereof, in the bridge circuit 1. An output terminal 25 of the microprocessor 11, in turn, generates a signal which corresponds to the mass flow rate of air ($\dot{m}$) through the intake port 24.

In the operation of the apparatus of the present invention, changes in the mass flow rate of air ($\dot{m}$) in the intake port 24 cause the resistance value of the precision resistor $R_S$ to correspondingly vary. This variation in resistance is caused by a corresponding change in the temperature of the resistor and, thus, affects the voltage balance of the voltage divider 2. As a result, a corresponding voltage $U_S$ is generated and, in turn, measured over the line 8 by the microprocessor 11. If there are changes in the temperature of the stream of air, the temperature dependent resistor $R_K$ responds, and the reference voltage $U_K$ is correspondingly altered.

If a constant ambient temperature $\theta u$ is assumed, only changes in the mass flow rate of air ($\dot{m}$) will lead to a bridge imbalance and, thus, changes in the bridge voltage $U_{Br}$. The bridge voltage $U_{Br}$ is in turn evaluated by the microprocessor 11. A signal indicative of the measured mass flow rate of air ($\dot{m}$), which is the result of the evaluation, is generated through the output terminal 25 of the microprocessor 11. The output signal indicative of the mass flow rate of air ($\dot{m}$) can then be supplied to a control unit (not shown) of the internal combustion engine to compute the optimum operating points therefor.

In order to restore the precision resistor $R_S$ to its desired operating temperature after a bridge imbalance, the bridge voltage $U_{Br}$ is processed by the microprocessor 11 to produce a clock signal. The clock signal is generated through the second port 23 and line 22 to actuate the transistor T1 and, accordingly, a timed operation of the heating resistor $R_H$ occurs. Thus, the heating resistor $R_H$ is operated at an increased output, that is, an increased temperature, until the precision resistor $R_S$ assumes the desired operating temperature, whereupon the bridge circuit 1 becomes balanced.

The apparatus of the present invention sets the timing duty cycle B as a function of the magnitude of the gating voltage $U_H$. The gating voltage $U_H$ is the voltage present across the heating resistor $R_H$, and is equal to the battery voltage $U_B$ minus the voltage drop across the collector to emitter path of the transistor T1, or saturation voltage $U_{sat}$. Thus, the microprocessor 11 measures the gating voltage $U_H$ through its first port 21.

In the operation of the apparatus of the present invention, the gating voltage $U_H$ is supplied to the heating resistor $R_H$ through the transistor T1. The value of the gating voltage $U_H$ is defined as follows:

$$U_H = U_B - U_{sat}$$

The timing of the transistor T1 is dependent on the duty cycle B, which is transmitted through the second port 23 of the microprocessor 11. Hence, the power output $P_H$ of the heating resistor $R_H$ is defined by the following equation:

$$P_H = B \cdot \frac{U_H^2}{R_H}$$

The power output $P_H$ is indicative of the heat generated by the resistor $R_H$, which is removed by the stream of air flowing over the resistor.

In the stationary state, the power output $P_H$ of the heating resistor $R_H$ can be defined as follows:

$$B \cdot \frac{U_H^2}{R_H} = g(\dot{m}) \cdot T_{UH} \qquad (2)$$

The variable $g(\dot{m})$ is a function of the mass flow rate of air, and $T_{UH}$ is the temperature of the heating resistor $R_H$.

When the temperature $T_{UH}$ is constant, the heating resistor $R_H$ has a constant resistance value. The value of the heating resistor $R_H$ is defined as follows:

$$R_H = R_{H20}[1 + a_H \cdot T_{UH}] \qquad (3)$$

$R_{H20}$ is the resistance value of the heating resistor $R_H$ at 20° C., and $a_H$ is the temperature coefficient of $R_H$ at 20° C. When the magnitude of the gating voltage $U_H$ is evaluated by the microprocessor 11, the mass flow rate of air ($\dot{m}$) can be determined based on the duty cycle B. The duty cycle B is defined as follows:

$$B = g(\dot{m}) \cdot \frac{T_{UH} \cdot R_H}{U_H^2} \qquad (4)$$

The fraction quotient in equation (4) is known, thus making it possible to determine the mass flow rate of air ($\dot{m}$) based on the duty cycle B.

In the operation of the apparatus of the present invention, the temperature $T_{UH}$ of the heating resistor $R_H$ is maintained at a constant desired value as hereinafter described. The precision resistor $R_S$ is maintained in thermal contact with the heating resistor $R_H$. The temperature $T_{US}$ of the precision resistor $R_S$ is therefore defined as follows:

$$T_{US} = k_0 \cdot T_{UH} \qquad (5)$$

Hence, the temperature $T_{US}$ of the precision resistor $R_S$ is related to the temperature $T_{UH}$ of the heating resistor $R_H$ through the factor $k_0$.

The resistance value of the precision resistor $R_S$ is defined by the following equation, which is analogous to equation (3) above:

$$R_S = R_{S20}[1 + a_S \cdot T_{US}] \qquad (6)$$

$R_{S20}$ is the resistance value of the precision resistor $R_S$ at 20° C., and $a_S$ is the temperature coefficient of the precision resistor $R_S$ at 20° C.

As described above, the precision resistor $R_S$ is coupled in the bridge circuit 1 with the temperature dependent resistor $R_K$ and the resistors R1 and R2. Thus, based on this arrangement, the reference voltage $U_K$ and the measuring voltage $U_S$ are defined as follows:

$$U_K = \frac{R_K}{R_K + R2} \cdot U_{Stab} \text{ and} \quad (7)$$

$$U_S = \frac{R_S}{R_S + R1} \cdot U_{Stab} \quad (8)$$

The voltages $U_K$ and $U_S$ are evaluated by the microprocessor 11 which, in turn, actuates the duty cycle B with software that can be appropriately adapted to perform this function by those skilled in the art, so that the reference voltage $U_K$ is made equal to the measuring voltage $U_S$. The resistor $R_S$ is then maintained at a constant value, and when the ambient temperature, which corresponds to the intake air temperature, is constant, the value of the resistor $R_S$ is defined as follows:

$$R_S = \frac{R_K}{R2} \cdot R1 = \text{constant} \quad (9)$$

Accordingly, the temperature $T_{US}$ of the precision resistor $R_S$, and the temperature $T_{UH}$ of the heating resistor $R_H$, are constant at a constant intake air temperature.

The microprocessor 11 is controlled to convert the reference voltage $U_K$, the measuring voltage $U_S$, and the gating voltage $U_H$ from analog to digital signals. The reference voltage $U_K$ and measuring voltage $U_S$, and their corresponding bit number $N_K$ and $N_S$, respectively, are defined as follows:

$$U_K = \frac{R_K}{R_K + R2} \cdot U_{Stab} \quad (10)$$

$$N_K = \frac{U_K}{U_{Stab}} \cdot N = \frac{R_K}{R_K + R2} \cdot N \text{ and}$$

$$U_S = \frac{R_S}{R_S + R1} \cdot U_{Stab} \quad (11)$$

$$N_S = \frac{U_S}{U_{Stab}} \cdot N = \frac{R_S}{R_S + R1} \cdot N$$

$N_K$ and $N_S$ are bit numbers, and N, which is the maximum bit number, is a power of 2. N is therefore defined as follows:

$$N = 2^X$$

X is a positive integer. Thus, for example, if $X = 8$, then $N = 256$.

In the stationary state, the value of $N_D$, which is the difference between $N_S$ and $N_K$ ($N_D = N_S - N_K$), becomes "0". When there are deviations in the operating temperature, however, the change in the value of $N_D$ ($\Delta N_D$) is defined as follows:

$$\Delta N_D = \Delta N_S - \Delta N_K = N \frac{R1}{(R_S + R1)^2} \cdot \Delta R_S \quad (12)$$

$$= N \frac{R1 \, R_{S20}}{(R_S + R1)^2} \cdot a_S \cdot \Delta T_{US}$$

Using equation (5) above, the change in $T_{UH}$ ($\Delta T_{UH}$) is defined as follows:

$$\Delta T_{UH} = \frac{(R_S + R1)^2}{R1 \cdot R_{S20}} \cdot \frac{1}{k0 \cdot a_S} \cdot \frac{\Delta N_D}{N} \quad (13)$$

Using equation (4) above, the duty cycle B is defined as follows:

$$B = k(\dot{m}, U_H) \cdot T_{UH} \cdot [1 + a_H \cdot T_{UH}] \quad (14)$$

k is a factor which is a function of the mass flow rate of air ($\dot{m}$) and the gating voltage $U_H$.

If the mass flow rate of air ($\dot{m}$) and the gating voltage $U_H$ are constant, and the exclusive temperature variation is the variation in the temperature $\Delta T_{UH}$ of the heating resistor $R_H$, the change in the duty cycle ($\Delta B$) is defined as follows:

$$\Delta B = k(\dot{m}, U_H)\{\Delta T_{UH}[1 + a_H \cdot T_{UH}] + T_{UH} \cdot a_H \cdot T_{UH}\} \quad (25)$$

$$= k(\dot{m}, U_H)[1 + 2a_H \cdot T_{UH}] \cdot \Delta T_{UH}$$

Based upon division by equation (14), $\Delta B$ is defined as follows:

$$\Delta B = B \frac{1 + 2a_H \cdot T_{UH}}{1 + a_H \cdot T_{UH}} \cdot \frac{\Delta T_{UH}}{T_{UH}} \quad (16)$$

After insertion of equation (13) into equation (16), B is further defined as follows:

$$\Delta B = B \frac{\frac{1 + 2a_H \cdot T_{UH}}{1 + a_H \cdot T_{UH}} \cdot \frac{1}{k_0 a_S T_{UH}} \cdot \frac{(R_S + R1)^2}{R1 \cdot R_{S20}}}{k} \cdot \frac{\Delta N_D}{N} \quad (17)$$

$$= k \cdot B \cdot \frac{\Delta N}{N}$$

This leads to the following standard equation:

$$\frac{\Delta B}{B} = k \cdot \frac{\Delta N}{N}$$

Equation (17) defines the control instruction for the duty cycle B. B a specific duty cycle in a specific period. Accordingly, $B_{N+1}$, which is the duty cycle in the next period, is defined as follows:

$$B_{N+1} = B_N + \Delta B$$

$$B_{N+1} = B_N + k \cdot B_N \cdot \frac{\Delta N}{N}$$

$$\boxed{B_{N+1} = B_N(1 + k \cdot \frac{\Delta N_D}{N})}$$

This is an iterative computer instruction, which can be implemented in software in the microprocessor 11 by those of ordinary skilled in the art.

To obtain the mass flow rate of air ($\dot{m}$) from equation (4), variations in temperature in the air are compensated for by controlling the temperature dependent resistor $R_K$ based on the following equation:

$$f(\dot{m}) = g(\dot{m}) \cdot T_{UH} \cdot R_H \neq f(\theta u) \quad (19)$$

f(m) is a function dependent on the mass flow rate of air (m). The equivalent applies for f(θu). f(m) is therefore further defined as follows:

$$f(\dot{m}) = B_{N+1} \cdot U_H^2 \qquad (20)$$

As a result of the analog to digital conversion of the gating voltage $U_H$, $N_H$ is defined as follows:

$$N_H = \frac{U_H}{U_{Stab}} \cdot N \qquad (21)$$

Therefore, based on equation (21), f(m) is defined as follows:

$$f(\dot{m}) = B_{N+1} \cdot \left(\frac{N_H}{N} \cdot U_{Stab}\right)^2 = \underbrace{k1 \cdot B_{N+1}}_{CONST.} \cdot N_H^2$$

Figure 2:
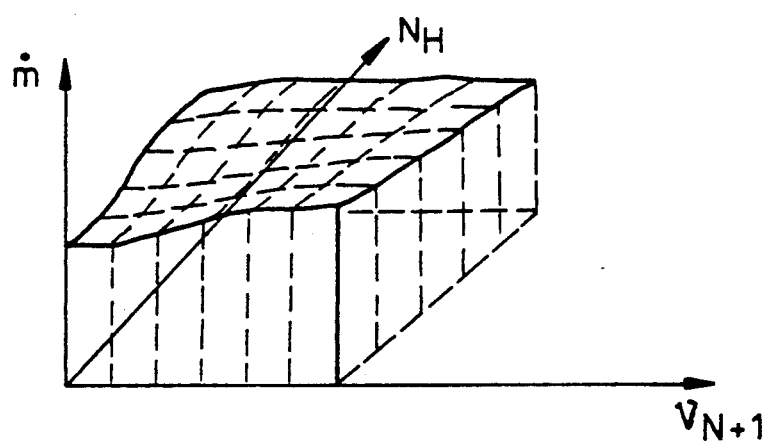
FIG. 2 is a three dimensional graph illustrating key operating performance parameters of the apparatus of FIG. 1.

These relationships are best evaluated in a performance graph, as illustrated in FIG. 2, which can also assume a linearization of the function f(ṁ). Then, either an analog voltage, a frequency, a bit word, or the like, can be delivered to the microprocessor 11.

Figure 3:
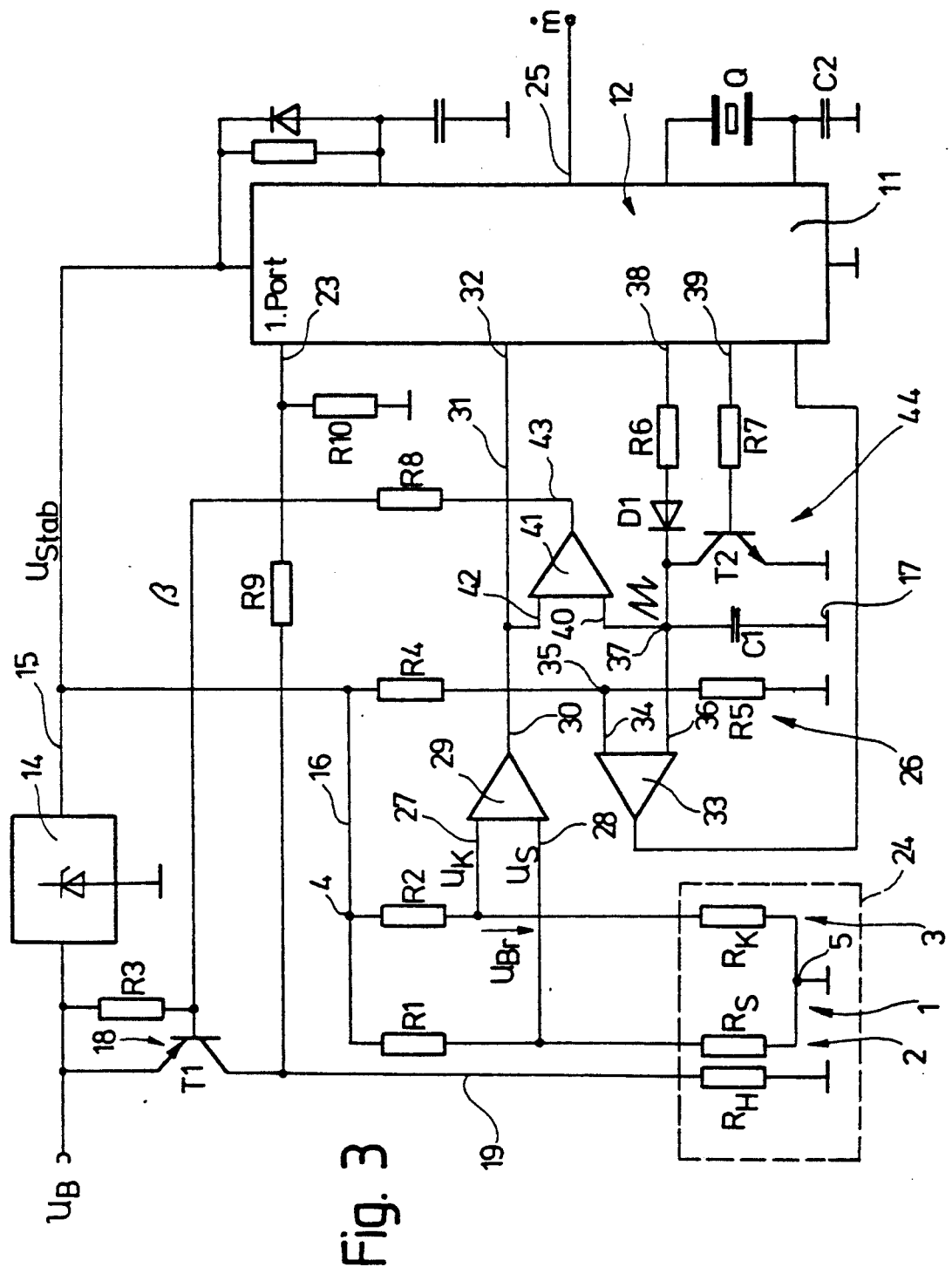
FIG. 3 is a schematic diagram of another apparatus embodying the present invention.

In FIG. 3, another apparatus embodying the present invention is illustrated. The apparatus of FIG. 3 is similar to the apparatus of FIG. 1 and, accordingly, the same components are indicated with the same reference numerals. In this embodiment, the control of the temperature of the heating resistor $R_H$ and, thus, the precision resistor $R_S$, is not implemented through the microprocessor 11. This, accordingly, reduces the computational load on the microprocessor 11 and, in turn, increases the control speed of the apparatus.

As with the apparatus of FIG. 1, the battery voltage $U_B$ is coupled to the emitter of the transistor T1. The collector of the transistor T1 is, in turn, coupled to the heating resistor $R_H$. A resistor R3 is coupled between the emitter of the transistor T1 and its base. The battery voltage $U_B$ is also supplied to a voltage stabilizing circuit 14. The output of the voltage stabilizing circuit 14, which is the stabilized voltage $U_{stab}$, is supplied to the microprocessor 11 through a line 15.

The apparatus also includes a voltage divider 26, which comprises two resisters R4 and R5 coupled together in series. The voltage divider 26 is coupled on one side to the line 15 and, thus, to the stabilized voltage $U_{stab}$. The other side of the voltage divider 26 is coupled to ground 17. Through line 16, which is coupled to line 15 and the voltage divider 26, the stabilized voltage $U_{stab}$ is supplied to the bridge circuit 1. As can be seen, the bridge circuit 1 is the same as the bridge circuit shown in FIG. 1.

The bridge volta $U_{Br}$ is supplied to the inputs 27 and 28 of a first comparator 29. The output 30 of the first comparator 29 is coupled by a line 31 to an input 32 of the microprocessor 11. A second comparator 33 has one input 34 coupled to the voltage tap 35 of a voltage divider 26. The other input 36 of the comparator 33 is coupled to a summation point 37.

A capacitor C1 has one terminal coupled to the summation point 37 and its other terminal coupled to ground 17. The microprocessor 11 has two outputs 38 and 39. The output 38 is coupled through a resistor R6 to the anode of a diode D1. The cathode of the diode D1 is in turn coupled to the summation point 37. The output 39 of the microprocessor 11 is coupled to a resistor R7 which is, in turn, coupled to the base of a transistor T2. The emitter of the transistor T2 is coupled to ground 17, and the collector is coupled to the summation point 37.

A third comparator 41 has an input 40 also coupled to the summation point 37. Another input 42 of the comparator 41 is coupled through line 31 to the output 30 of the first comparator 29. The output 43 of the comparator 41 is coupled to a resistor R8 which is, in turn, coupled to the base of the transistor T1. The collector of the transistor T1 is coupled through a resistor R9 to a first port 23 of the microprocessor 11. As shown in FIG. 3, the first port 23 is grounded through a resistor R10.

The apparatus further includes a quartz crystal Q coupled in series with a capacitor C2 which is, in turn, coupled to ground. The circuit formed by the quartz crystal Q and capacitor C2 is coupled to the microprocessor 11. The microprocessor 11, along with the circuit of the capacitor C1, form a sawtooth generator 44.

In the operation of the apparatus of the present invention, a square pulse sequence is transmitted through the output 38 of the microprocessor 11 which charges the capacitor C1. When the potential of the capacitor C1 reaches the level of the voltage U, the second comparator 33 initiates an interrupt routine. The voltage U is defined as follows:

$$U = \frac{R5}{R5 + R4} \cdot U_{Stab}$$

The output 39 of the microprocessor 11 charges the capacitor C1 by actuation of the transistor T2. This creates a sawtooth voltage at the summation point 37. The third comparator 41 compares the sawtooth voltage to the output value of the first comparator 29, which has the bridge volta $U_{Br}$ applied to its inputs 27 and 28. Depending on the output voltage of the first comparator 29, the comparator 41 produces a duty cycle B at its output 43. The duty cycle B is used to actuate the transistor T1 and, accordingly, is regulated so that the heating resistor $R_H$ maintains a constant operating temperature.

The magnitude of the gating voltage $U_H$ is also supplied to the microprocessor 11, in the form of a voltage signal, which is proportional to the gating voltage $U_H$, applied to the first port 23. The voltage signal is supplied by the voltage divider formed by the resistors R9 and R10. The microprocessor 11 processes the voltage signal and correspondingly adjusts the square pulse sequence transmitted through its output 38.

The microprocessor 11 of FIG. 3 is used to generate the square pulse sequence for generating the sawtooth voltage. The microprocessor 11 also processes the voltage signal of the bridge circuit 1, which is supplied by the first comparator 29 to the input 32 through the line 31. The voltage signal of the bridge circuit 1 is used to determine the mass flow rate of air (ṁ), which is transmitted from the output terminal 25 of the microprocessor 11. However, as described above, the function of controlling the temperature of the heating resistor $R_H$ is principally performed by the circuitry independent of the microprocessor 11.

What is claimed is:
1. A method for controlling the temperature of a precision resistor for measuring the mass flow rate of air flowing around the precision resistor and entering an internal combustion engine, the temperature of the precision resistor being dependent upon the mass flow rate of air, comprising the following steps:

measuring a first voltage across the precision resistor, the first voltage being indicative of the temperature of the precision resistor and the mass flow rate of air;

measuring a second voltage across a heating resistor supported in thermal contact with the precision resistor;

generating a clock signal; and controlling the duty cycle of the clock signal, the clock signal controlling the flow of electric current from a voltage supply to the heating resistor for controlling the temperature of the heating resistor and, in turn, for controlling the temperature of the precision resistor in thermal contact with the heating resistor, the duty cycle being based on the measured first voltage and the magnitude of the measured second voltage.

2. A method as defined in claim 1, wherein the clock signal actuates a transistor coupled between the voltage supply and the heating resistor.

3. A method as defined in claim 1, wherein the voltage supply includes a battery of the internal combustion engine.

4. An apparatus for controlling the temperature of a precision resistor for measuring the mass flow rate of air flowing around the precision resistor and entering an internal combustion engine, comprising:

a precision resistor, the temperature of the precision resistor being dependent upon the mass flow rate of air;

a heating resistor supported in thermal contact with the precision resistor;

an electrical switching element coupled to a voltage supply and to the heating resistor for controlling the flow of electric current from the voltage supply to the heating resistor for controlling the temperature of the heating resistor and, in turn, for controlling the temperature of the precision resistor; and a control unit coupled to the switching element for measuring a first voltage across the precision resistor, the first voltage being indicate of the temperature of the precision resistor and the mass flow rate of air, for measuring a second voltage across the heating resistor, for generating a clock signal, and for controlling the duty cycle of the clock signal, the clock signal controlling the actuation of the switching element, the duty cycle being based on the measured first voltage and the magnitude of the measured second voltage.

5. An apparatus as defined in claim 4, further comprising:

a bridge circuit including a first bridge arm and a second bridge arm, each bridge arm being a voltage divider and coupled to the control unit, the first bridge arm including the precision resistor.

6. An apparatus as defined in claim 5, further comprising:

a voltage stabilizing circuit having an input coupled to the voltage supply and an output coupled to the control unit and to the bridge circuit, the stabilizing circuit converting the voltage supply signal to a stabilized voltage signal and, in turn, transmitting the stabilized voltage signal to the control unit and to the bridge circuit.

7. An apparatus as defined in claim 5, wherein the control unit is coupled to a voltage tap on the first bridge arm and a voltage tap on the second bridge arm of the bridge circuit, the control unit evaluating a voltage across the bridge circuit to, in turn, generate an output signal indicative of the mass flow rate of air entering the internal combustion engine.

8. An apparatus as defined in claim 5, further comprising:

a first comparator, the output of the first comparator being coupled to the switching element to control the actuation thereof, and a first input of the first comparator being coupled to the bridge circuit to receive a signal indicative of the bridge voltage therefrom; and a sawtooth voltage generator coupled to a second input of the first comparator to transmit a sawtooth voltage signal thereto, the first comparator comparing the bridge voltage signal to the sawtooth voltage signal to, in turn, actuate the switching element upon the coincidence of the two signals.

9. An apparatus as defined in claim 11, wherein the control unit determines the mass flow rate of air entering the internal combustion engine based on the bridge voltage of the bridge circuit.

10. An apparatus as defined in claim 9, wherein the sawtooth voltage signal generated by the sawtooth voltage generator is based on the magnitude of the second voltage.

11. An apparatus as defined in claim 4, wherein the control unit includes a first port coupled to the output of the switching element for determining the level of the second voltage.

12. An apparatus as defined in claim 11, wherein the switching element is a transistor, the base of the transistor being coupled to a second port of the control unit, the collector of the transistor being coupled to the first port of the control unit, and the emitter of the transmitter being coupled to the voltage supply.

* * * * *